Patented Dec. 7, 1926.

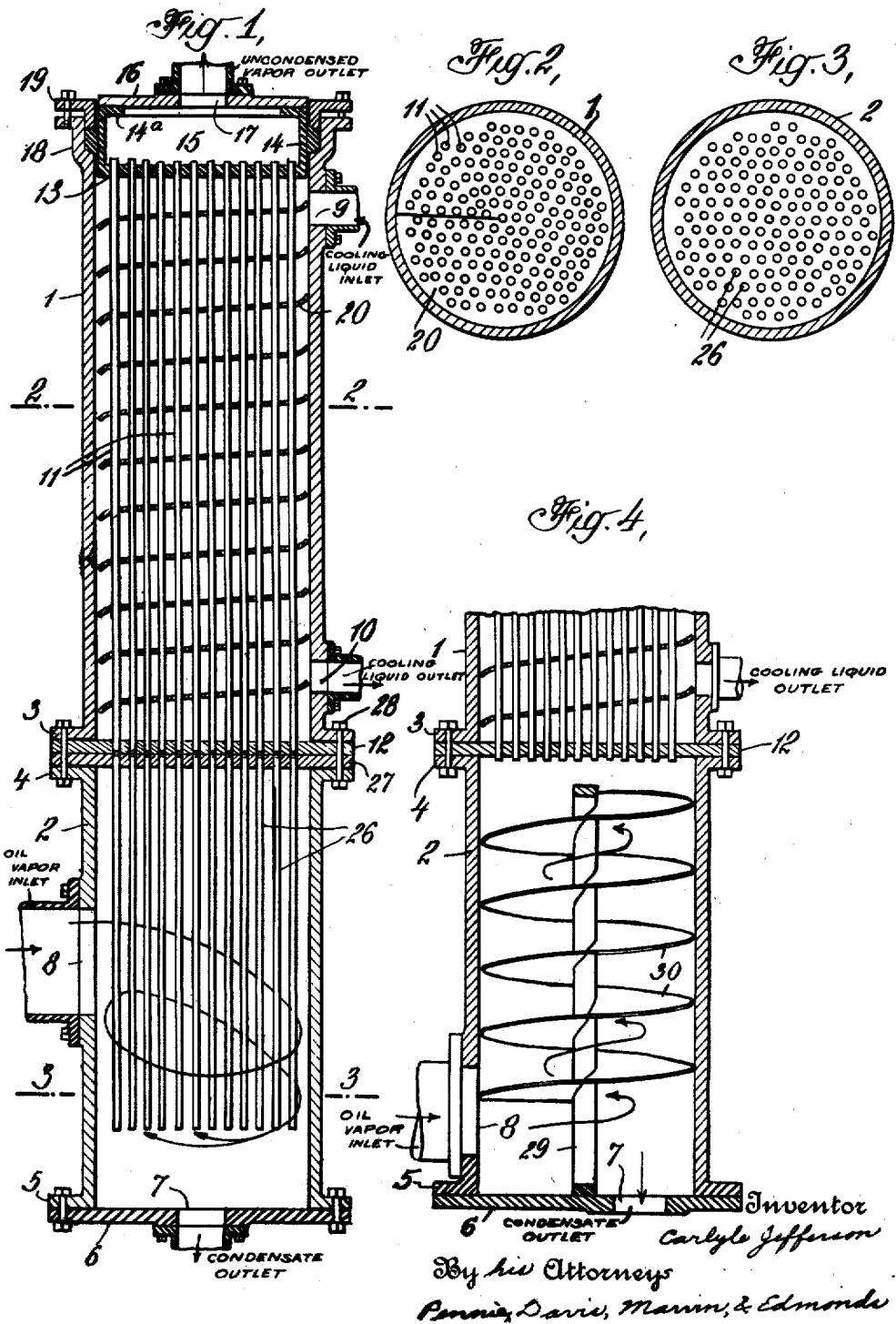

1,609,822

UNITED STATES PATENT OFFICE.

CARLYLE JEFFERSON, OF NEW YORK, N. Y., ASSIGNOR TO THE GRISCOM-RUSSELL COMPANY, OF NEW YORK, N. Y., A CORPORATION OF DELAWARE.

APPARATUS FOR PETROLEUM REFINING.

Application filed January 25, 1921. Serial No. 439,758.

The present invention relates to apparatus for use in the distillation of various substances, and is particularly applicable for use as a "dephlegmator" in oil refining for effecting condensation of a portion of the vapors coming from the still and subsequently re-evaporating the lighter fractions of the condensate.

In the fractional distillation of oil or other substances the various constituents normally pass off at different definite temperatures. The vapor distilled off at any given temperature does not, however, consist solely of that particular constituent at whose boiling temperature the distillation takes place, but contains very appreciable quantities of constituents both more and less volatile than the main constituent. To increase the purity of the distilled product it is necessary to repeat this distilling process a number of times depending on the purity of distillate desired. Such procedure entails alternate condensing of the distilled vapor and application of heat to effect its re-evaporaton until a product of the desired purity is obtained, which method consumes large amounts of heat and requires much time.

The object of this invention is to provide an apparatus of this type in which the heat required for the re-evaporation of a portion of the condensate is obtained from the hot distilled vapors entering the shell, and in which no extraneous heat need be introduced into the system.

It is also an object of the present invention to provide an apparatus in which the heavier portions of the distillate and the more volatile constituents are separated and discharged from separate outlets in liquid and vapor form, respectively.

It is also an object of the invention to provide an apparatus of this type of small dimensions, the space required being but a fraction of that at present required for apparatus accomplishing a like purpose.

It is an object of the invention to provide a dephlegmator of this type of high overall efficiency.

It is a still further object to provide an apparatus of this type of simple construction, such that the majority of its parts may be readily cast or stamped from sheet metal and used directly without machining.

I have illustrated a preferred embodiment of my invention in the accompanying drawings, in which—

Fig. 1 is a vertical sectional view of an apparatus for oil refining in accordance with my invention;

Fig. 2 is a sectional view on the line 2—2 of Fig. 1; Fig. 3 is a sectional view taken on the line 3—3 of Fig. 1; and Fig. 4 is a partial longitudinal sectional view showing a modified form of apparatus.

Referring to the drawings, particularly to Fig. 1, the apparatus consists of an upper portion or shell 1 and a lower shell 2. The shells are here shown as cylindrical metal castings provided at their inner ends with flanges 3 and 4 for attaching them together. The lower end of the shell 2 is provided with a flange 5 upon which fits an end plate 6 having a discharge opening 7. An inlet opening 8 is located in the side wall of the shell approximately midway of its height. The upper shell 1 is provided near its end with openings 9 and 10, serving as inlet and outlet means, respectively, for the cooling fluid employed in the apparatus.

Within the shell 1 there is a number of parallel tubes 11 vertically arranged and having their lower ends welded or expanded into a circular tube sheet 12, which fits against flange 3 at the lower end of the shell. The upper ends of tubes 11 are fixed in tube sheet 13. This tube sheet is constructed integrally with a cylindrical side wall 14, thus forming a chamber 15 in direct communication with the upper ends of tubes 11. The outer end of the chamber 15 is closed by means of a plate 16 resting upon flange 14ª and provided with an opening 17 serving as an outlet from the chamber. This chamber is not rigidly attached to the shell but constitutes a floating head movable vertically as the tubes contract and expand, a fluid-tight joint between the chamber and the walls of the shell being obtained by means of packing 18 held in place by a packing ring 19 adapted to be bolted to the upper end of the shell.

Within the shell 1 and in the space surrounding the tubes 11 there is placed a spiral baffle 20 of diameter substantially equal to that of the interior of the shell. This baffle, in conjunction with the side walls of the shell, constitutes a long tortuous fluid passage through the shell substantially transverse to the tubes. The lower end of this passage communicates with inlet 10 and the upper end with outlet 9. Baffle 20 preferably extends substantially the entire length of the shell but may be made in any length desired.

Baffle 20 may be built as a unitary structure, in which case a baffle of definite length would be constructed for each length of shell. I prefer, however, to construct the baffle of a number of vanes or units, each consisting of one complete turn. These units may be readily cast or stamped from sheet metal in a single operation. When this construction is employed the baffle may be made of any desired length by merely inserting as many of the units or vanes as desired. Such vanes may be conveniently stamped from sheet metal at a single stroke, and consist of a radially slit metal plate having its cut edges displaced vertically an amount depending upon the pitch of baffle desired. The meeting edges of adjacent baffles may be connected by butt straps or by welding or any other suitable method, or may be left free of each other as each baffle is independently held in position. Each vane is provided with holes adapted to fit loosely about the tubes, thereby allowing them to be put in place in the apparatus and providing a thin annular space around each tube through which a thin stream of oil will flow at a relatively high velocity and prevent clogging or accumulation of impurities adjacent to the tubes.

Within the shell 2 is a number of vertical tubes 26 having their upper ends welded or expanded into a tube sheet 27, which rests upon flange 4 of the lower shell, and held rigidly by means of bolts 28 which serve to connect the upper and lower portions of the apparatus. The lower ends of the tubes 26 are unsupported and open directly into the interior of the shell. These tubes are of the same diameter and are the same in number as the tubes 11 of the upper shell. Their arrangement is also identical, so that when tube sheets 12 and 27 are placed together the upper ends of the lower tubes will exactly coincide with the lower ends of tubes 11, thus constituting an essentially continuous tubular passage from the upper end of shell 1 to the lower end of shell 2. The entire tubular passage may be formed of single continuous tubes rather than two sets of tubes 11 and 26, in which case only a single tube sheet or diaphragm would be necessary at the joint between the two shells, the tubes being rigidly supported in this diaphragm and having their upper ends attached to a floating head as in the present structure and their lower ends left open.

In the use of my improved apparatus, vapor from the retort or still is admitted to the lower shell through inlet 8 and, passing through the entire length of the tubular passage, may be discharged at outlet 17, a pressure difference being held between inlet 8 and outlet 17 for the purpose of maintaining a steady flow. Cooling fluid is admitted into shell 1 through inlet 9 and, after flowing through the spiral passage formed by baffle 20, is discharged through outlet 10. An opposite direction of flow may be employed if desired, in which case opening 10 would serve as inlet for the cooling fluid and the opening 9 as the outlet. In other words, either the direct flow principle or a counter-flow arrangement may be employed as desired, each of the two arrangements possessing advantages in certain instances.

The hot vapors from the still entering at inlet 8 are free to circulate in the space within the shell 2 surrounding the tubes 26 and are eventually drawn into the open ends of tubes 26 and passed upward into tubes 11. Here the hot vapors come into heat transferring relation with the cooling fluid and a portion of the vapor is condensed. The condensate collects on the side walls of the tubes and under the influence of gravity flows downward in a direction opposite to that of the flow of the vapor and re-enters tubes 26. Here the condensate is in heat transferring relation with the hot distilled vapors in the shell 2, and consequently the lighter fractions will be re-evaporated and passed upward again into tubes 11, while the liquid portion will flow out at the ends of tubes 26 and be discharged through outlet 7.

The separation of the lighter and heavier fractions of the distillate is thus effected. Increasing the quantity of cooling fluid supplied or supplying it at a lower temperature will increase the proportion of liquid discharged to vapor discharge. Conversely, decreasing the quantity of cooling fluid supplied will result in the discharge comprising a larger proportion of vapor. Thus it is seen that any proportion of liquid to vapor in the discharge may be obtained by regulating the supply of cooling fluid. The separation is accomplished in a single apparatus and does not require the addition of extraneous heat, thereby effecting a marked economy in time and fuel required for evaporating the liquid.

In Fig. 4 there is illustrated a modified form of my apparatus, the upper section, however, being identical with that shown in Fig. 1. The lower shell 2 is flanged at its upper end and is secured directly against the tube sheet 12, there being no tubes extending downward into the lower shell. Supported on the bottom plate 6 is a vertical core tube 29 which serves as a central support for a solid spiral baffle 30. This baffle is preferably a unitary continuous structure and may either extend over substantially the entire length of the lower shell or over only a portion of its length. The vapor inlet 8 is positioned near the lower end of baffle 30, and the distillate outlet 7 is offset from the center of plate 6 to allow the core tubes 29 to be supported at that point.

Vapor enters at 8, passes up through the tortuous passage formed between baffle 30 and the shell walls, and from thence passes upward into tubes 11. That portion of the distillate which is condensed in tubes 11 drains out at their lower ends and falls upon the upper turn of the baffle 30, from whence it makes its way under the influence of gravity down along the spiral passage, and out at the opening 7, the portion of the condensate which is re-evaporated during its passage along the baffle mingling with the entering vapor and being again conveyed upward into tubes 11.

My improved apparatus is embodied completely in a unitary structure of small dimensions and the addition of extraneous heat is not required for the re-evaporation of the lighter fractions of the condensate. I have found that an apparatus in accordance with my invention has an extremely high over-all efficiency and that the space required is but a fraction of that required for present equipment accomplishing a like purpose.

It is to be understood that the details of construction may be varied without departing from the spirit of the invention. The pitch of the baffle may be constant or it may be varied along the length of the shell, the baffles may extend substantially the entire length of the shell or along only a portion of its length, and the baffle surface may be smooth or may be constructed in a series of blades as disclosed in the co-pending application of Russell C. Jones, Serial No. 449,678. Other variations in the construction may be resorted to within the full scope of the appended claims.

I claim:

1. Apparatus of the class described comprising a containing shell having upper and lower portions, heat transferring tubes within said shell constituting a fluid passage, the lower ends of the tubes opening into the said lower portion of the shell, an inlet for admitting the hot vapors to the lower portion of said shell whereby said vapors first circulate about the exterior surfaces of the tubes extending into said portion of the shell and then enter the open ends of said tubes, means for circulating a cooling medium through the upper portion of said shell in heat transferring relation with the tubes therein to thereby condense a portion of the vapors traversing said tubes, the condensate thus formed draining under the influence of gravity into the lower portions of the tubes extending into said lower shell portion to thereby come into heat transferring relation with the hot vapors circulating about said tubes and flowing within said tubes, whereby reevaporation of the more volatile portions of said condensate is effected, means for withdrawing from the lower portion of said shell the condensate which is not re-evaporated and means for withdrawing from the upper end of the apparatus the vapors passing said heat transferring tubes uncondensed.

2. In an apparatus for refining petroleum the combination of a containing shell having upper and lower portions, an inlet for admitting vapors to the lower portion of said shell, a vertical tubular passage for said vapors extending into both the upper and lower portions of the shell, means for bringing a cooling fluid into contact with the upper portion of said passage thereby condensing part of the vapors passing therethrough, the condensate flowing in a film down said tubular passage under the influence of gravity in a direction opposite to that of the flow of the vapor, means for bringing the hot incoming vapors first into contact with the outer surface of that portion of said tubular passage which extends into said lower portion of the shell thereby transferring heat to the condensate through the heat conducting walls of said passage to effect reevaporation of a portion of said condensate and then passing the said vapors into the lower end of said tubular passage into direct contact with the condensate therein and separate outlet means for removing said condensate and the uncondensed vapors from the apparatus.

3. Apparatus of the class described comprising a containing shell having upper and lower portions, heat transferring tubes within the upper portion the lower ends of the tubes opening into the lower portion of the shell means for circulating a cooling medium through the upper portion of the shell in heat transferring relation with the tubes therein to thereby condense a portion of the vapors traversing the interior of these tubes, the condensate thus formed draining under the influence of gravity into the lower portion of the shell, heat transferring means in said lower portion for receiving said condensate, and an inlet for admitting hot vapors to said lower portion, said heat transferring means being adapted to convey said condensate downwardly in film-like form and to bring said hot vapors into heat exchanging relation with said condensate so as to reevaporate the more volatile portions thereof, the vapors thereafter entering the tubes in the upper portion of the shell, means for withdrawing from the lower portion of the shell the condensate which is not re-evaporated, and means for withdrawing from the upper end of the apparatus the vapors passing the heat transferring tubes uncondensed.

4. In an apparatus for refining petroleum adapted to receive the distilled vapors, a containing shell having an upper and a lower portion, a passage within said shell for said distilled vapors consisting of a plurality of vertically positioned parallel tubes opening at their lower ends into the space within said shell, an inlet in the lower portion of said shell for admitting the hot distilled vapors into the open lower ends of said tubes after contacting with the outer surfaces of their lower portions, a baffle member in the upper portion of said shell constituting a tortuous path for conveying a cooling fluid into contact with the upper parts of said tubes, said vapors being partially condensed in the upper parts of the tubes and the condensate partially re-evaporated in the lower parts of the tubes into which it flows under the influence of gravity, as a film covering the inside of the tubes and receiving heat from the vapors flowing in heat exchanging relation with both sides of said film, outlet means communicating directly with the upper ends of said tubes for discharging the uncondensed vapors, and outlet means communicating directly with the lower ends of said tubes for discharging the condensate.

5. Apparatus of the class described comprising a containing shell having an upper and a lower portion heat transferring tubes traversing the respective portions of said shell and constituting a passage through the apparatus for vapors supplied thereto, means for circulating a cooling medium about the upper end of said passage to condense a portion of the vapors passing upwardly therethrough, the condensate thus formed draining back toward the lower end of the apparatus, outlet means for the vapors issuing from said passage uncondensed, inlet means for conducting hot vapors into the apparatus, means for first circulating said incoming vapors about the lower ends of the heat transferring tubes into the lower portion of said shell and then conducting said vapors into said tubes, and an outlet at the bottom of the shell for withdrawing the condensate from the apparatus.

In testimony whereof I affix my signature.

CARLYLE JEFFERSON.

4. In an apparatus for refining petroleum adapted to receive the distilled vapors, a containing shell having an upper and a lower portion, a passage within said shell for said distilled vapors consisting of a plurality of vertically positioned parallel tubes opening at their lower ends into the space within said shell, an inlet in the lower portion of said shell for admitting the hot distilled vapors into the open lower ends of said tubes after contacting with the outer surfaces of their lower portions, a baffle member in the upper portion of said shell constituting a tortuous path for conveying a cooling fluid into contact with the upper parts of said tubes, said vapors being partially condensed in the upper parts of the tubes and the condensate partially re-evaporated in the lower parts of the tubes into which it flows under the influence of gravity, as a film covering the inside of the tubes and receiving heat from the vapors flowing in heat exchanging relation with both sides of said film, outlet means communicating directly with the upper ends of said tubes for discharging the uncondensed vapors, and outlet means communicating directly with the lower ends of said tubes for discharging the condensate.

5. Apparatus of the class described comprising a containing shell having an upper and a lower portion heat transferring tubes traversing the respective portions of said shell and constituting a passage through the apparatus for vapors supplied thereto, means for circulating a cooling medium about the upper end of said passage to condense a portion of the vapors passing upwardly therethrough, the condensate thus formed draining back toward the lower end of the apparatus, outlet means for the vapors issuing from said passage uncondensed, inlet means for conducting hot vapors into the apparatus, means for first circulating said incoming vapors about the lower ends of the heat transferring tubes into the lower portion of said shell and then conducting said vapors into said tubes, and an outlet at the bottom of the shell for withdrawing the condensate from the apparatus.

In testimony whereof I affix my signature.

CARLYLE JEFFERSON.

Certificate of Correction.

It is hereby certified that in Letters Patent No. 1,609,822, granted December 7, 1926, upon the application of Carlyle Jefferson, of New York, N. Y., for an improvement in "Apparatus for Petroleum Refining," an error appears in the printed specification requiring correction as follows: Page 4, line 46, claim 5, after the word "tubes" insert the word *extending;* and that the said Letters Patent should be read with this correction therein that the same may conform to the record of the case in the Patent Office.

Signed and sealed this 1st day of February, A. D. 1927.

[SEAL].

M. J. MOORE,
*Acting Commissioner of Patents.*

Certificate of Correction.

It is hereby certified that in Letters Patent No. 1,609,822, granted December 7, 1926, upon the application of Carlyle Jefferson, of New York, N. Y., for an improvement in " Apparatus for Petroleum Refining," an error appears in the printed specification requiring correction as follows: Page 4, line 46, claim 5, after the word " tubes " insert the word *extending;* and that the said Letters Patent should be read with this correction therein that the same may conform to the record of the case in the Patent Office.

Signed and sealed this 1st day of February, A. D. 1927.

[SEAL.]

M. J. MOORE,
*Acting Commissioner of Patents.*